Dec. 19, 1939.　　　　C. D. LOVELACE　　　　2,183,816
FISH LURE
Filed April 18, 1938
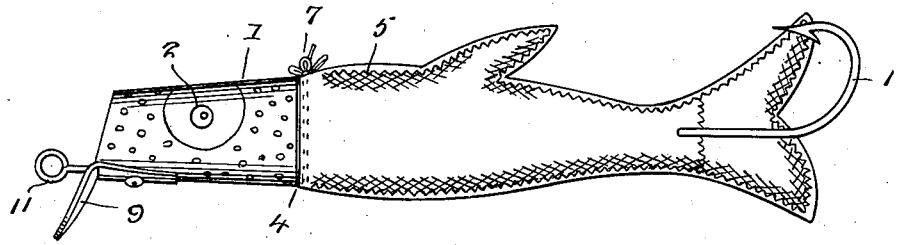
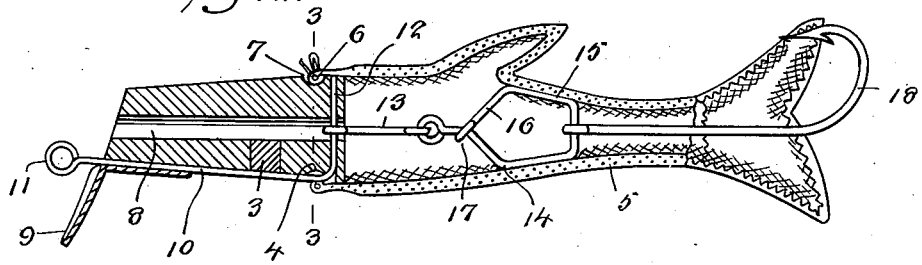
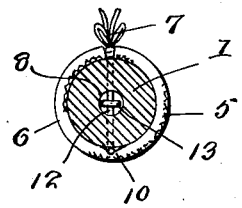
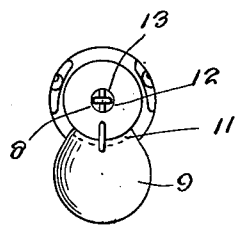
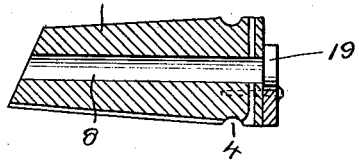
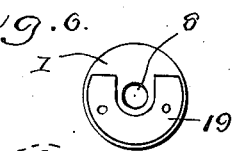
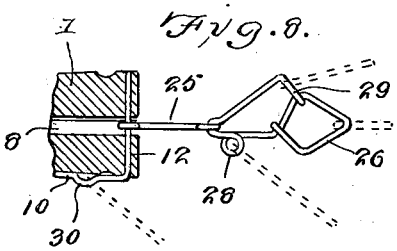
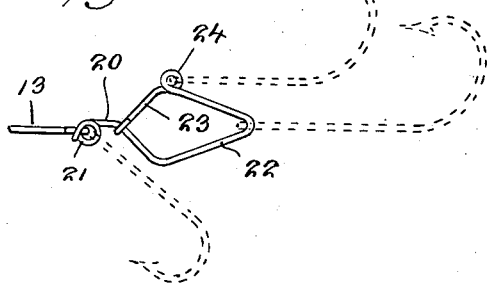
Charles D. Lovelace
INVENTOR
BY Victor J. Evans & Co.
ATTORNEYS Patented Dec. 19, 1939

2,183,816

UNITED STATES PATENT OFFICE 2,183,816

FISH LURE

Charles D. Lovelace, San Antonio, Tex., assignor to Claribel Lovelace

Application April 18, 1938, Serial No. 202,767

2 Claims. (Cl. 43—46)

This invention relates to fish lures, and its general object is to provide an artificial lure in the form of a minnow or the like, that not only simulates a live or natural minnow or fish generally used for bait from the standpoint of configuration and design, but has substantially all the other characteristics thereof in that the minnow which forms the subject matter of the present invention possesses yieldable qualities as distinguished from the hard and rigid nature of the conventional wooden or metallic artificial minnow, and an extremely important feature is the fact that my minnow is capable of producing a pulsating movement of the body thereof, so as to give the effect of natural breathing, therefore its qualities to attract and entice fish is much greater than that of artificial lures and the like now in general use.

A further object is to provide an artificial minnow or the like that includes a head portion and a number of bodies that are interchangeably and detachably associated with the head portion, each body being of different color or design to be used when desired.

Another object is to provide an artificial minnow or the like, that is weighted to be held in an upright position when in use, and the hooks thereof are detachably associated therewith, so that one or more hooks of any size may be used, the hooks being attached and arranged so as to be amply protected against being caught in obstructions, weeds or the like.

A still further object is to provide an artificial minnow or the like, that can be controlled as to its depth and movement thereof in the water, by the use of a bendable deflecting or baffle plate, and the body of the minnow is not only pliable, as well as hollow, to receive and eject water to give the same its yielding qualities and pulsating action as previously set forth, but the hook attaching assembly is pivotally secured with respect to the head portion and supports the body in a manner to allow lateral life like movement thereof, so as to simulate the swimming action of a live minnow or fish.

Another object is to provide an artificial minnow or the like, that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a side elevation of the minnow which forms the subject matter of the present invention.

Figure 2 is a longitudinal sectional view taken therethrough with parts in elevation.

Figure 3 is a sectional view taken approximately on line 3—3 of Figure 2, looking in the direction of the arrows.

Figure 4 is a front view of the head portion.

Figure 5 is a longitudinal sectional view taken through a modified form of head portion and weight therefor.

Figure 6 is a rear view of the form as shown in Figure 5.

Figure 7 is a modified form of hook attaching means.

Figure 8 is another modified form of hook attaching means.

Referring to the drawing in detail, the reference numeral 1 indicates the head portion of my artificial minnow or fish, and is shown as being of substantially cylindrical formation and slightly tapered inwardly toward the front end thereof, which is forwardly inclined as shown, to reduce water resistance, as will be apparent. The head is painted or otherwise decorated to simulate the like portion of a live minnow or fish, with eyes 2 that are shown as being in the form of beads secured thereto by any suitable means, but the eyes may likewise be painted thereon, as will be apparent, or applied in any manner.

In the form as best shown in Figure 2, a weight 3 is mounted in a recess in the head in a manner to be countersunk therein, and it will be obvious that the weight is for the purpose of holding the minnow in an upright position.

Disposed in and about the head adjacent the rear end thereof is an annular groove 4 to provide a seat for receiving means for attaching the body 5 of the minnow to the head, and in the form as shown, the body is provided with a hem 6 at the inner end thereof, through which is threaded a draw string 7, the hem being mounted in the seat and secured therein by the string 7, the latter being knotted for that purpose, as shown. The body is hollow and is made from any suitable yieldable or pliable material such as fabric or rubber, and while a draw string has been shown for securing the body to the head, other means may be employed for that purpose, such as a rubber band or circular coil spring. In any event, the body is shaped to conform to that of a live minnow or fish, as it is tapered accordingly and includes fins and a tail, and the body is likewise printed, painted or otherwise decorated to simulate the body of a live minnow or the like.

The head is provided with the bore 8 extending through the longitudinal center thereof, for the passage of water to and from the body, so that when a slight forward movement is given to the line attached to the minnow, the body will become completely filled with water and when the line is slacked, some of the water is ejected therefrom, with the result it will be obvious that such will bring about a pulsating action of the body and thereby simulate or give the effect of natural breathing, it being apparent that the pulsating action is caused by alternately jerking and slacking the line.

Secured to the underside of the head 1 is a deflecting or baffle plate 9 of substantially right angle configuration, with one portion curved to follow the curvature of the head and fixed thereto by a screw as shown, while the other portion is of disk like concaved formation and disposed at a forward inclination in depending relation with respect to the head, as well as being inclined to substantially the same degree as the forward end, as shown. The plate 9 not only acts to give the minnow a life like swimming movement, as it is drawn through the water, but the plate can be bent at different angles with respect to the head, to vary the depth of the minnow within the water. The plate also acts for securing an attaching wire 10 to the head and the wire 10 is seated in a groove in the under surface of the head and longitudinally thereof, with a forward extending portion terminating into an eye 11 for attachment of a line thereto, while the rear portion 12 of the wire is mounted in a bore disposed transversely of the head adjacent the rear end thereof, so that the wire bridges the bore 8, as best shown in Figure 2.

Pivotally secured to that portion of the right angled bent rear end of the wire 10 that extends through the bore 8 is a link 13 terminating in eyes for attachment to the portion 12 as set forth, and connected to the other eye of the link 13 is the eyed end of a hook attaching means which I term a safety pin catch. The hook attaching means 14 is formed from a single strand of resilient wire to provide a substantially rectangular portion 15 of a width to fit within the body to aid in holding the same distended and in alignment with the head, as will be obvious upon inspection of Figure 2, and the hook attaching means includes a free arm 16 terminating in a keeper 17 for connection with the shank of the attaching means. By that construction, it will be apparent that the fish hook which is indicated by the reference numeral 18 can be readily removed and applied with respect to the attaching means, and the hook 18 extends through an opening adjacent to the tail portion of the body for disposal exteriorly thereof.

The opening through which passes the shank of the hook 18 is reinforced in any well known manner, and the hook portion together with the barb thereof is disposed in contacting engagement with the tail, so as to tend to prevent the same from becoming hooked in obstructions, weeds and the like.

Due to the pivotal association of the link 13 with the right angle portion 12 of the attaching wire 10, coupled with the fact that the body is formed from fabric, rubber or other pliable material, it will be seen that as the minnow is drawn through the water, the body will be given a lateral swinging movement, and thereby will simulate the natural swimming action of a live minnow or fish.

While I have stated that the head 1 is of substantially cylindrical formation, I want it understood that the head can be of any shape suitable for the purpose, and in Figures 5 and 6 it will be noted that I have illustrated a modified form of weight indicated by the reference numeral 19. The weight 19 is of U-shape formation and is secured to the rear end of the head by nails or the like as shown, for disposal in face to face engagement therewith, so that the weight 19 will be completely covered by the body 5, but it will also act to hold the minnow in an upright position, as best shown in Figure 1.

In Figure 7 I have illustrated a modified form of hook attaching means, for the purpose of receiving a number of hooks, and this attaching means which is likewise in the form of a safety pin includes a shank 20 coiled upon itself at its free end as at 21 for attachment to the link 13 and the coil 21 likewise provides an eye for a hook, as shown.

The body portion 22 of the hook attaching means of Figure 7 is of substantially diamond shape to provide a restricted end for the purpose of receiving a hook, and at the juncture of the free arm 23 with the body portion 22, there is provided an eye 24, also for the purpose of receiving a hook, therefore it will be seen that the attaching means of Figure 7 is capable of receiving at least three fish hooks, which can be readily applied and removed with respect thereto, and the hooks likewise extend through suitable reinforced openings in the body of the minnow. The free arm 23 terminates in a keeper for connection with the shank 20 at its juncture with the body portion.

In Figure 8 I have illustrated a further modified form of hook attaching means which is likewise made from a single strand of resilient wire, for connection with a link 25 similar to the link 13, and in this form, the body portion 26 is likewise of substantially diamond shape to receive a hook at the outer end thereof and the body portion includes a free arm 27 terminating in a keeper for securing the latter hook thereto, as shown. The strand, from the body portion 26 extends into a portion coiled to provide an eye 28 for receiving a hook and thence is looped upon itself for connection with the link 25, and terminates in a free arm 29 having a keeper thereon, for connection with the body portion. The free arm portion is likewise for the purpose of receiving a hook. While only one eye 28 is provided for the hook attaching means or safety catch of the form of Figure 8, an eye may be provided for each hook, merely by looping the strand of wire upon itself in eye formation.

In Figure 8, it will be further noted that the line attaching wire 10 is looped as at 30 to be spaced from the head, to provide means for attaching another hook with respect to the minnow.

Again, referring to the body 5 of my minnow or fish, and which is detachably associated with the head 1, I wish to make it clear that any number of different bodies may be used, and interchangeable with respect to the head, each body being of different color, shape and design, and can be changed when desired, in an easy and expeditious manner.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A fish lure comprising a head, a collapsible hollow body secured to the body and formed from pliable material, said head having water inlet and outlet means communicating with the body for the passage of water into and out of the body to cause a pulsating action thereof, line attaching means secured to the head and extended forwardly therefrom, means included in the line attaching means and bridging the water inlet and outlet means, hook attaching means including a link pivotally secured to the bridging means, said hook attaching means being mounted in the body and fitting a portion of the wall thereof to aid in holding the body distended and in alignment with the head, a hook secured to the hook attaching means and extending through the body, said hook having its outer portion engaged with the body to protect the barb thereof, a deflecting plate secured to the head, and a weight secured to the head for holding the lure in an upright position.

2. A fish lure comprising a weighted head, a collapsible hollow body detachably secured to the head and formed from pliable material, said head having a water inlet and outlet bore extending longitudinally therethrough for communication with the body for the passage of water into and out of the body to cause a pulsating action thereof, a line attaching wire extending longitudinally of the undersurface of the head and beyond the forward end thereof, with its forward end terminating into an eye for receiving a line, the rear portion of the wire being bent substantially at right angles to its remaining portion and extending through the head for disposal transversely of the bore, hook attaching means linked to the portion of the wire within the bore for pivotal movement and extending into the body, said hook attaching means engaging the wall of the body along the top and bottom thereof to aid in holding the body distended and in alignment with the head, said hook attaching means including means for detachably securing hooks thereto for passage through the body, and a deflecting plate secured to the undersurface of the head and securing the line attaching wire in place, and said head including a disk like concaved portion depending from the forward end of the head.

CHARLES D. LOVELACE.